United States Patent
Reis et al.

(10) Patent No.: US 12,355,483 B2
(45) Date of Patent: Jul. 8, 2025

(54) CONCEALED SPREAD SYMBOL COMMUNICATION

(71) Applicant: Higher Ground LLC, Palo Alto, CA (US)

(72) Inventors: Darren Robert Reis, Palo Alto, CA (US); David Alexander Reuss, San Leandro, CA (US); Robert S. Reis, Palo Alto, CA (US)

(73) Assignee: Higher Ground LLC, Palo Alto, CA (US)

( * ) Notice: Subject to any disclaimer, the term of this patent is extended or adjusted under 35 U.S.C. 154(b) by 267 days.

(21) Appl. No.: 18/095,499

(22) Filed: Jan. 10, 2023

(65) Prior Publication Data

US 2023/0261691 A1     Aug. 17, 2023

Related U.S. Application Data

(60) Provisional application No. 63/298,091, filed on Jan. 10, 2022.

(51) Int. Cl.
*H04B 1/707* (2011.01)

(52) U.S. Cl.
CPC .................................. *H04B 1/707* (2013.01)

(58) Field of Classification Search
CPC .................................. H04B 1/69; H04B 1/707
See application file for complete search history.

(56) References Cited

U.S. PATENT DOCUMENTS

2017/0195874 A1* 7/2017 DeLeeuw ............. H04W 12/04

\* cited by examiner

*Primary Examiner* — Rahel Guarino
(74) *Attorney, Agent, or Firm* — BEHMKE INNOVATION GROUP LLC; James M. Behmke; Andy L. Schofield

(57) ABSTRACT

According to one or more of the embodiments herein, systems and techniques are provided for concealed spread symbol communication. In particular, a system in accordance with the techniques herein relates to concealing communication (a reduced risk of being detected), particularly messages over satellites communication channels. The techniques herein provide additional message concealment by using a randomly variable sequence of spreading chips. The techniques also ensure that the randomized chip sequences used by the user equipment and by the ground station are synchronized.

20 Claims, 12 Drawing Sheets

CONCEALED SPREAD SYMBOL COMMUNICATION

RELATED APPLICATION

This application claims priority to U.S. Prov. Appl. No. 63/298,091, filed on Jan. 10, 2022, entitled CONCEALED SPREAD SYMBOL COMMUNICATION, by Darren Robert Reis, et al., the contents of which are incorporated herein by reference.

TECHNICAL FIELD

The present disclosure relates generally to wireless communication systems, and, more particularly, to concealed spread symbol communication.

BACKGROUND

Aside from the risk of an adversary being able to eavesdrop on a communication channel and decipher confidential communication, there is an inherent risk of the adversary being able to detect that communication is taking place. This is risk is especially large with personnel or devices whose location should be kept secret such as soldiers behind enemy lines or covert sensors.

To reduce the chance of being detected, people can, and usually do, use communication equipment that transmit at a very low power. Spread spectrum is commonly used to spread the transmission power over a large spectrum resulting in a very low power density footprint at any specific frequency. Using spread spectrum, the power density at any given frequency can be reduced to be lower than the power of thermal noise making it non-obvious that there is any active communication at any given frequency. Communication using frequency spreading provides also the additional benefit wherein jamming of the communication by transmitting powerful signal in a specific frequency may be easily overcome.

Still, spread spectrum communications do not completely prevent an adversary from detecting that communication takes place. Since the spreading codes are well known, an adversary may be listening for transmissions and processing the received signals with multiple spreading codes. When the adversary guesses the right spreading code, the adversary can detect the transmission as well as the location of the transmitter.

SUMMARY

According to one or more of the embodiments herein, systems and techniques are provided for concealed spread symbol communication. In particular, a system in accordance with the techniques herein relates to concealing communication (a reduced risk of being detected), particularly messages over satellites communication channels. The techniques herein provide additional message concealment by using a randomly variable sequence of spreading chips. The techniques also ensure that the randomized chip sequences used by the user equipment and by the ground station are synchronized.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

As noted above, it is often the case that wireless communication needs to be kept confidential (undecipherable), as well as covert (undetected). As also noted above, although spread spectrum is commonly used produce a very low power density footprint across a range of frequencies, spread spectrum communications do not completely prevent an adversary from detecting the communication or the location of the transmitter.

The techniques herein, therefore, provide for concealed spread symbol communication that better conceals the communication transmitters, making it more difficult for an adversary to detect that any communication takes place.

Notably, one of the most used spread spectrum schemes is the orthogonal variable spreading factor (OVSF). Using this method, before each signal is transmitted, the signal is spread over a wide spectrum range through the use of a spreading code also known as a "chip". The spreading is done by multiplying each one of the communication symbols by the chip. To facilitate communication by multiple users, each user is given a specific spreading code out of a set of mutually orthogonal spreading codes (chips).

Figure 1:
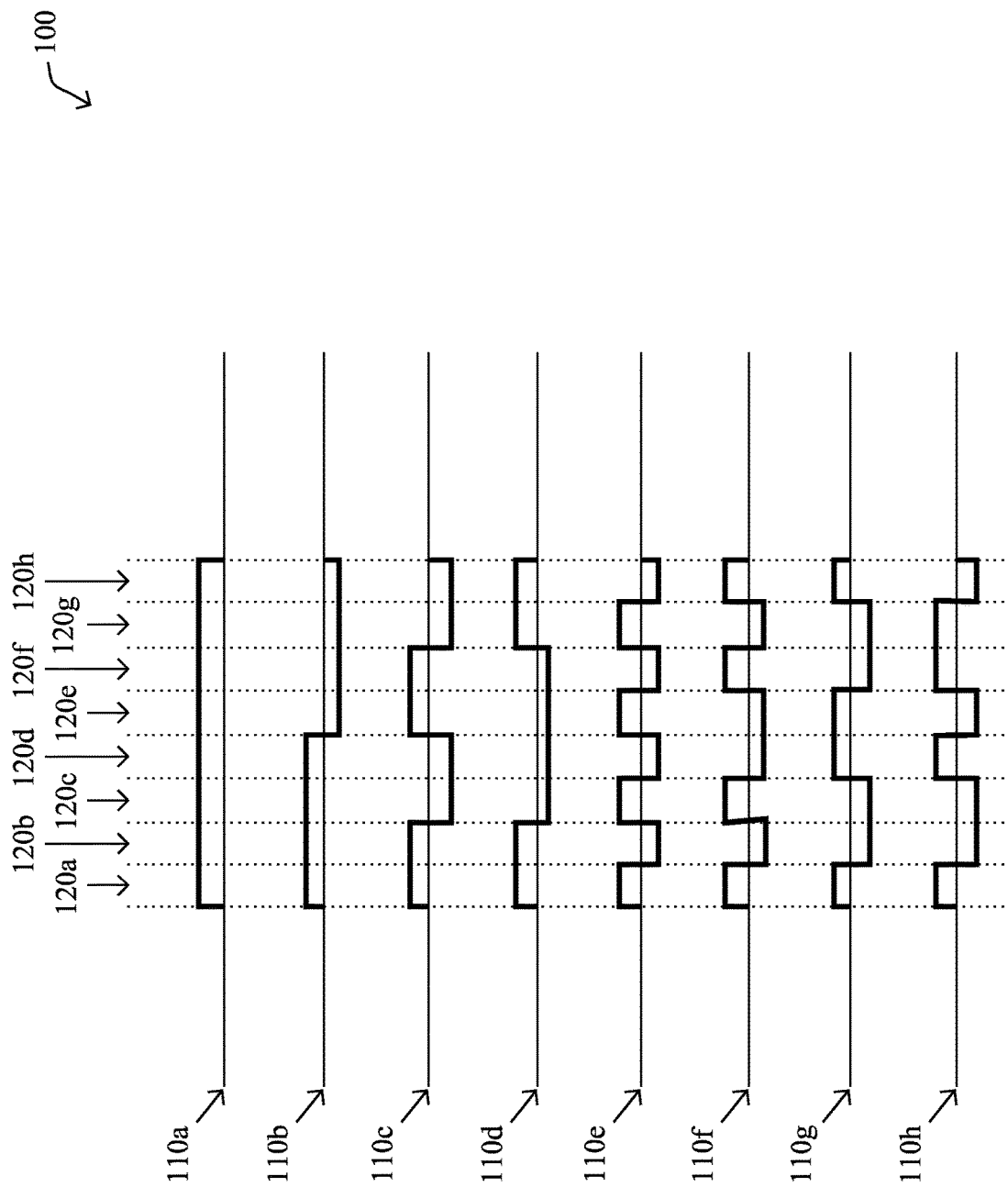
FIG. 1 illustrates an example drawing of spreading codes of length eight in accordance with one or more embodiments of the present disclosure.

FIG. 1 is an example illustration 100 that provides a pictorial description of orthogonal spreading codes of length eight. Codes 110a through 110h can get the values of either 1 or −1 in each one of the eight timeslots 120a through 120h. The orthogonality property can be observed by multiplying any two of the spreading codes 110a through 110h values in each corresponding timeslots and summing the results. On the other hand, multiplying any chip by itself and summing up the results yields an integer equivalent to the length (number of timeslots the chip occupies) of the chip.

Code division multiple access (CDMA) communication assigns orthogonal chips such as those shown in FIG. 1 to various users. Each user is assigned a unique spreading code. Because the assigned chips are orthogonal, transmission from any user, who uses a first chip, once it is multiplied by a chip assigned to other users results in zero power at the receiver. The receiver demodulates a signal from any user by multiplying the received signal by the spreading code associated with the desired user. For the desired user, multiplying the received signal by the respective chip results in the original signal. On the other hand, multiplying the received signal from any other user by the chip associated with the desired user, results in zero due to the orthogonality property of the signals.

Figure 2:
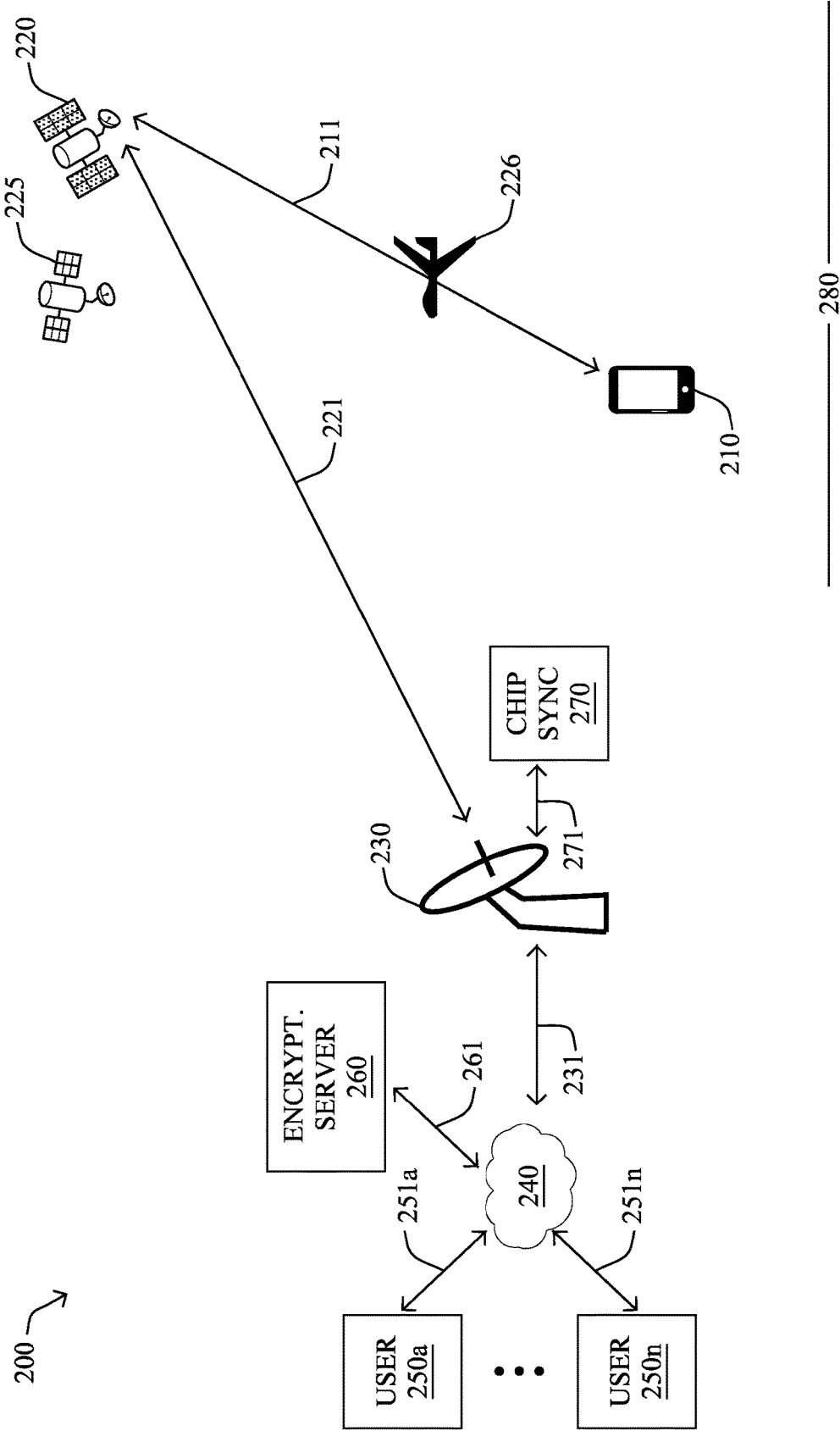
FIG. 2 illustrates an example communication system (e.g., satellite) in the presence of adversary eavesdropping drone and/or satellite in accordance with one or more embodiments of the present disclosure.

FIG. 2 illustrates an example of a communication environment 200 in the presence of an eavesdropping adversary (e.g., drone, satellite, etc.). Users may use user equipment 210 (e.g., terminal, mobile device, "SatCom" device, etc.) to establish satellite communication via satellite 220 to communicate with intended users (user equipment, or "UEs") 250a through 250n. Communication satellite 220 and ground station 230 use communication links 211, 221, 231, 251a-n, and 261 to provide communication links for the communication infrastructure. Encryption server 260 performs encryption and decryption services on the transmitted and received messages. Chip synchronization server 270 ensures that the receivers and transmitters of the mobile device 210 and ground station 230 are kept in sync as explained in greater detail below.

Adversary satellite 225 and adversary drone 226 illustratively fly above terrain 280 with the goal of detecting radio transmissions and determining the location of such transmission if any. Specifically, adversary satellite 225 and adversary drone 226 attempt to detect the transmission from mobile device 210 and determine the location from which the transmission originates.

As explained above, the fact that mobile device uses spread spectrum reduces the radio energy density of the transmitted signal. However, if the adversary satellite 225 and/or the adversary drone 226 manages to guess the spreading code (chip) used by the mobile device, it would be able to detect the transmitted signal and determine the location from which transmission takes place.

To reduce the risk of detection of the transmitting mobile device a system, the techniques in accordance with the embodiments herein utilize a different spreading code for each one of the symbols it transmits. As such, even if the adversary drone or satellite manages to guess one of the chips used, they would be able to demodulate at most only a single symbol. Given the need for detecting also the phase and timing of the signal, the probability of actually identifying the symbol is greatly reduced.

Existing methods for radio transmission concealment use longer spreading codes. However even a longer spreading code can be guessed and once found compromise the fact that radio transmission took place, including the location from where transmission took place.

In contrast, a system according to the techniques herein utilizes a dynamic time varying spreading code which is much more difficult to guess by a trial and error method.

Figure 3:
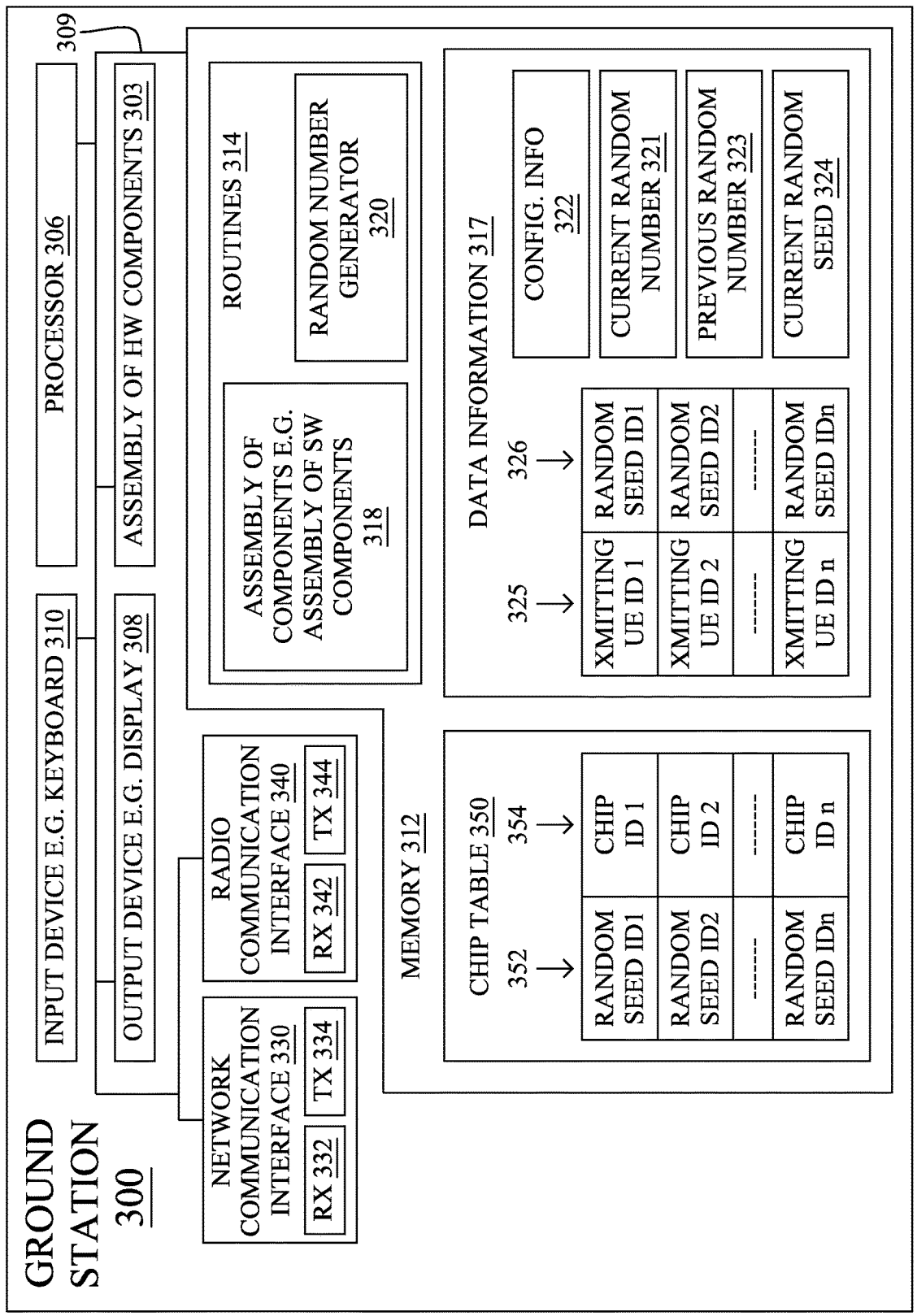
FIG. 3 illustrates an example of a ground station communication system that uses dynamic random spreading code synchronization in accordance with one or more embodiments of the present disclosure.
Figure 4:
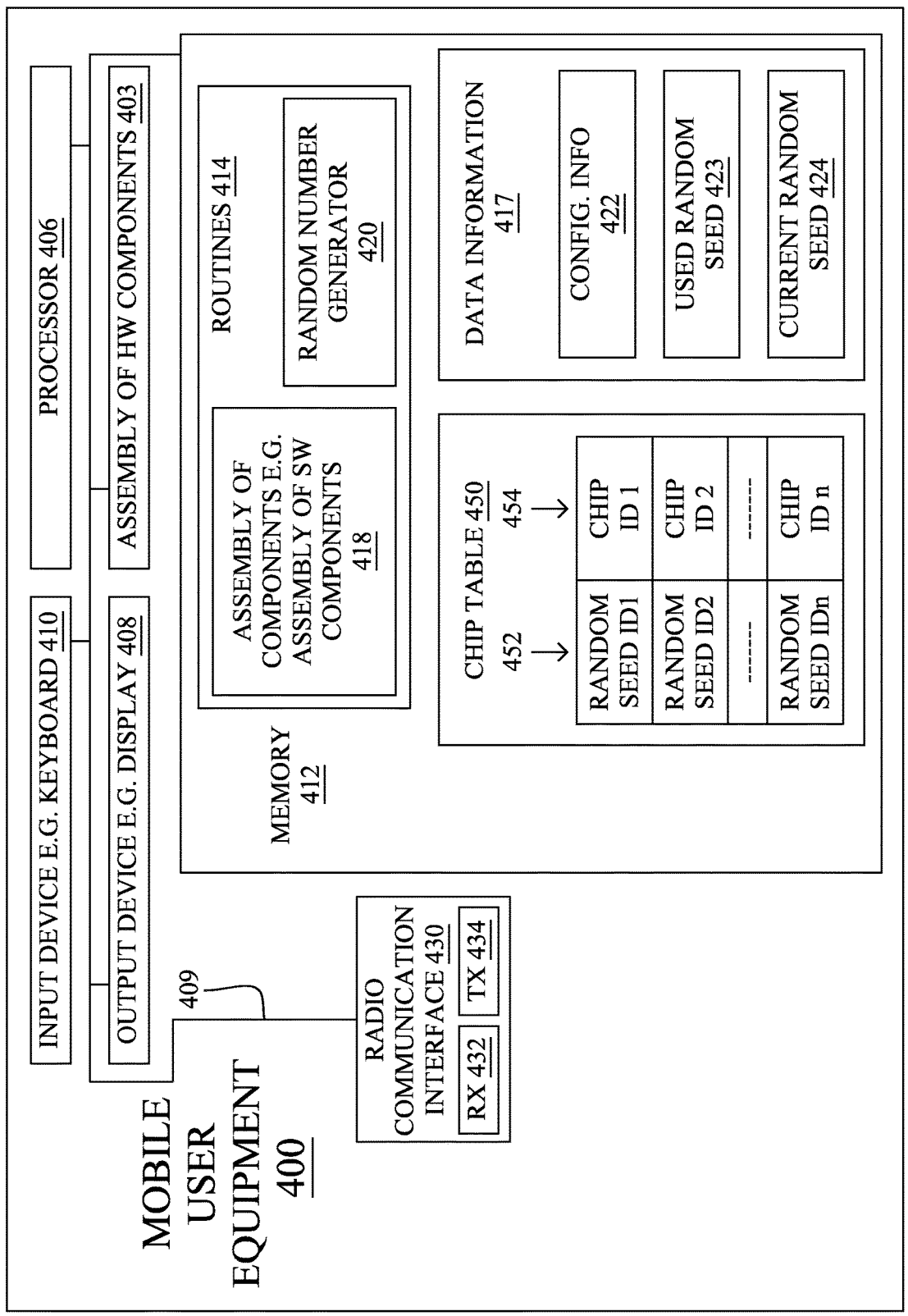
FIG. 4 illustrates an example of a user equipment apparatus that uses dynamic random spreading code synchronization in accordance with one or more embodiments of the present disclosure.

FIGS. 3-4 illustrate an example operation of a system with a dynamically variable spread code.

FIG. 3 in particular, is a drawing of an example ground station apparatus 300, e.g., dynamic random spreading code synchronization module, in accordance with an example embodiment herein. In some embodiments, the dynamic random spreading code synchronization module apparatus 300 is part of a server attached to network 240 shown in FIG. 2.

Ground station apparatus 300 (e.g., one illustrative "beaconing device" herein, though other types of beaconing devices may be used with the techniques herein) includes a communications interface 330, a processor 306, an output device 308, e.g., display, printer, etc., an input device 310, e.g., keyboard, keypad, touch screen, mouse, etc., a memory 312 and an assembly of components 303, e.g., assembly of hardware components, e.g., assembly of circuits, coupled together via a bus 309 over which the various elements may interchange data and information. Network communications interface 330 and radio communication interface 340 facilitate external communication via satellite such as satellite 220 of FIG. 2 and communication network such as network 240 of FIG. 2.

Network communications interface 330 includes a receiver 332 via which the ground station apparatus can receive data and information, e.g., including communication information from user devices e.g., devices 250 of FIG. 2, and a transmitter 334, via which the ground station apparatus 300 can send data and information, e.g., message exchange with UEs 250 of FIG. 2, etc.

Radio communications interface 340 includes a receiver 342 via which the ground station apparatus can receive data and information, e.g., including communication information from user devices e.g., devices 210 of FIG. 2, and a transmitter 344, via which the ground station apparatus 300 can send data and information, e.g., message exchange with UE 210 of FIG. 2, etc.

Memory 312 includes routines 314, data/information 317, and chip table 350. Routines 314 include assembly of components 318, e.g., an assembly of software components, and random number generator 320. In accordance with one embodiment, the software components 318 include also a module that generates a beacon signal that is broadcasted by the ground station to all of the UEs 210. In accordance with a specific embodiment, the beacon signal includes a random number generated by the random number generator 320. In accordance with another embodiment, the random number generator is a module of the HW assembly 303. In accordance with yet another embodiment the random number generator and/or the beacon generation module are modules of a network attached server 260.

In either case the ground station broadcasts a random number to all of the mobile devices such as UEs 210 of FIG. 2 (only one UE is shown). As explained below in greater detail, the random number that is included in the beacon transmitted from the ground station towards the mobile devices is changed periodically, e.g., every few seconds, every minute, or whenever the ground station detects communication from a new mobile device such as device 210 of FIG. 2.

Data information 317 includes a configuration data 322 entered by the system administration, current random number storage 321 (maintains the random number that is currently transmitted), previous random number storage 323 (the previous randomly generated number which was used previously), and current random number seed storage 324 (described below). Current random number storage 321 maintains the random number which is generated by the random number generator 320 based on the random number seed stored in current random number seed storage 324. As explained below in greater detail, the mobile UE such as UE 210 of FIG. 2 use the broadcasted random number in order to select a specific chip with which it modulates symbols as part of their spread spectrum modulation. The ground station continuously listens to transmissions from any potential transmitter such as UE 210 of FIG. 2 and attempts to demodulate the signal using the chip it knows that the UE would use upon receiving the random number it is currently broadcasting.

However, due to the delay associated in the communication between the ground station and the mobile device such as device 210 (e.g., from the round trip traversal via a satellite 220 in FIG. 2), there could be a case wherein the ground station switches to broadcast a new seed random number as part of its beacon signal and shortly after that it receives a signal that was transmitted by the UE and modulated by a chip associated with the previous random number. Therefore, the ground station must listen to the received signals not only by using a chip associated with the current random number 324 but also using a chip associated with the previous random number 323.

The memory 312 includes also chip table 350 which associates chips with specific random numbers. Column 352 provides entries of random numbers that can be generated by the random number generator such as random number generator 320. Column 354 provides a unique chip ID for each one of the random numbers in column 352.

As explained above, when ground station broadcasts a specific random number seed, which corresponds to a specific random number, as part of its beacon signal, the radio receiver of the ground station, e.g., receiver 342, uses the chip associated by table 350 with the current random number seed stored in memory 324 (or associated accordingly with the associated random number stored in memory storage 321). Additionally, to compensate for the communication delay of the satellite communication system, the receiver is instrumented to continuously monitor the received signal and also attempt to decode it using a chip associated by table 350 with the previous random number stored in memory module 323.

It should be noted that for sake of simplicity of explanation the figure illustrates only a single previous random number and as such only association with a single chip. In operation, however, the system may, and often does, store multiple previous random numbers and their associated chips resulting in a longer chip signal that facilitates the detection and de-spreading of the received signal.

The data information 317 also includes mobile radio UE synchronization tracking table including columns 325 and 326. As explained in greater detail below, the mobile device starts transmitting information modulated by a specific chip associated with a random number it receives via the broadcasted beacon. Then, according to an agreed upon rule (which can be, and often is) configured by the system administrator, after transmitting n symbols (e.g., n=1, 2, etc.) modulated with a first chip, it uses its own random number generator and generates a new random number. The new random number is associated with a new spread spectrum chip that the UE uses to transmit the next symbol.

Upon successfully de-spreading a signal from a UE using either a chip associated with current random number 324 or by the previous random number 323, the ground station stores the ID of the UE from which it received a message in a table and specifically in column 325 of the table. Accordingly, the associated chip ID used for de-spreading the signal from that specific UE is stored in column 326 of the table.

The ground station follows the same rule of updating the chip used for de-spreading and after de-spreading n symbols (e.g., n=1, 2, 3, . . . ) with the first chip, it uses the first chip ID associated with that UE to generate the next random number in a manner similar to (e.g., identical to) the way the mobile radio device updates its random number and the associated chip ID. As such, the receiver 342 is synchronized with the random chip that each UE is using at any time. This allows a receiver of the ground station to de-spread and to receive information from UEs that continuously change in a random way the chip they use. On the other hand, an adversary that does not have access to the information would not be able to recreate this random sequence of chips and as such would fail to detect the signal which is transmitted at or below the noise level, e.g., 5 db below the noise level.

The ground station and the radio mobile device. e.g., UE 210 of FIG. 2, may get out of sync in case. This could happen if due to noise or jamming the ground station fails to decode one of the information symbols transmitted by the UE or when the UE fails to decode the acknowledgment send by the ground station. In either case, when the UE determines a potential breakdown in communication it reverts back to listening to the beacon transmitted from the ground station and picking up the current random number from the beacon signal. Since the receiver of the ground station always listens to received signals and attempts to demodulate them (de-spread them) with chips associated with either current random number or the previous random number, the random ground station and the UE re-establish a synchronized random number and proceed using it as described above using the UE specific entries in the table with columns 325 and 326.

FIG. 4 is a drawing of an example user equipment apparatus 400, e.g., a mobile radio communication device that uses dynamic random spreading code synchronization in accordance with an example embodiment.

User equipment apparatus 400 includes a radio communications interface 430, a processor 406, an output device 408, e.g., display, printer, speaker, etc., an input device 410, e.g., keyboard, keypad, touch screen, mouse, microphone, etc., a memory 412 and an assembly of components 403, e.g., assembly of hardware components, e.g., assembly of circuits, coupled together via a bus 409 over which the various elements may interchange data and information. Radio communications interface 430 facilitate external communication via satellite such as satellite 220 of FIG. 2 and communication network such as network 240 of FIG. 2.

Radio communications interface 430 includes a receiver 432 via which the user equipment apparatus can receive data and information, e.g., including communication information from user devices e.g., devices 250 of FIG. 2, via ground station, e.g., ground station 230 of FIG. 2. Communications interface 430 includes also a transmitter 434, via which user equipment apparatus 400 can send data and information, e.g., message exchange with ground station 230 and UEs 250 of FIG. 2, etc.

Memory 412 includes routines 414, data/information 417, and chip table 450. Routines 414 include assembly of components 418, e.g., an assembly of software components, and random number generator 420. In accordance with one embodiment the software components 418 also includes a module that analyzes the beacon signal that is broadcasted by the ground station, e.g., such as ground station 230 of FIG. 2. As part of the processing the system determines the random number transmitted by ground station and stores it in current random seed storage space 424.

When the UE is about to send the first symbol of a message, it uses the current random number seed 424 to generate an associated random number 423. The random number is used as an entry into the chip table 450 and selects the associated chip from row 454. As soon as the current random number is used, the random number generator is invoked to generate the next random number. The next random number is used to pick up the next chip from the chip table 450, and the next chip is used to transmit the next symbol of the message.

In accordance with another embodiment, the random number is updated in accordance to the same rule that governs the random number updates in the ground station. Thus, both the ground station and the user equipment maintain the same random number which is shared only by these devices. Consequently, both devices which use the same chip table mapping table 350 and 450 resulting in both devices using the same chip. This synchronization guarantees that the ground station 300 and the UE 400 can de-spread (demodulate) the signal send by the UE to the ground station as well as the signal send by the ground station to the UE.

On the other hand, adversaries that attempt to detect the signal which is send at a frequency power density below noise level would not be able to reconstruct the right sequence of chips and therefore would not be able to de-spread the signal, resulting in concealment of radio being transmitted by the UE.

The ground station, e.g., ground station 230 of FIG. 2, and the radio mobile device 400, may get out of sync in certain cases. This could happen if due to noise or jamming the ground station fails to decode one of the information symbols transmitted by the UE or when the UE fails to decode the acknowledgment send by the ground station. In either case when the UE determines a potential breakdown in communication it reverts back to listening to the beacon transmitted from the ground station and picking up the current random number seed from the beacon signal. As explained above, the seed is used as an input for the random signal generator which produces a random number identical to a number which is in the ground station. This number is used by the UE as an entry into the chip table resulting in the UE obtaining the same chip used in the ground station receiver. This would facilitate establishment of a new connection between the UE and the ground station. The operation would continue normally per explanation above.

Figure 5A:
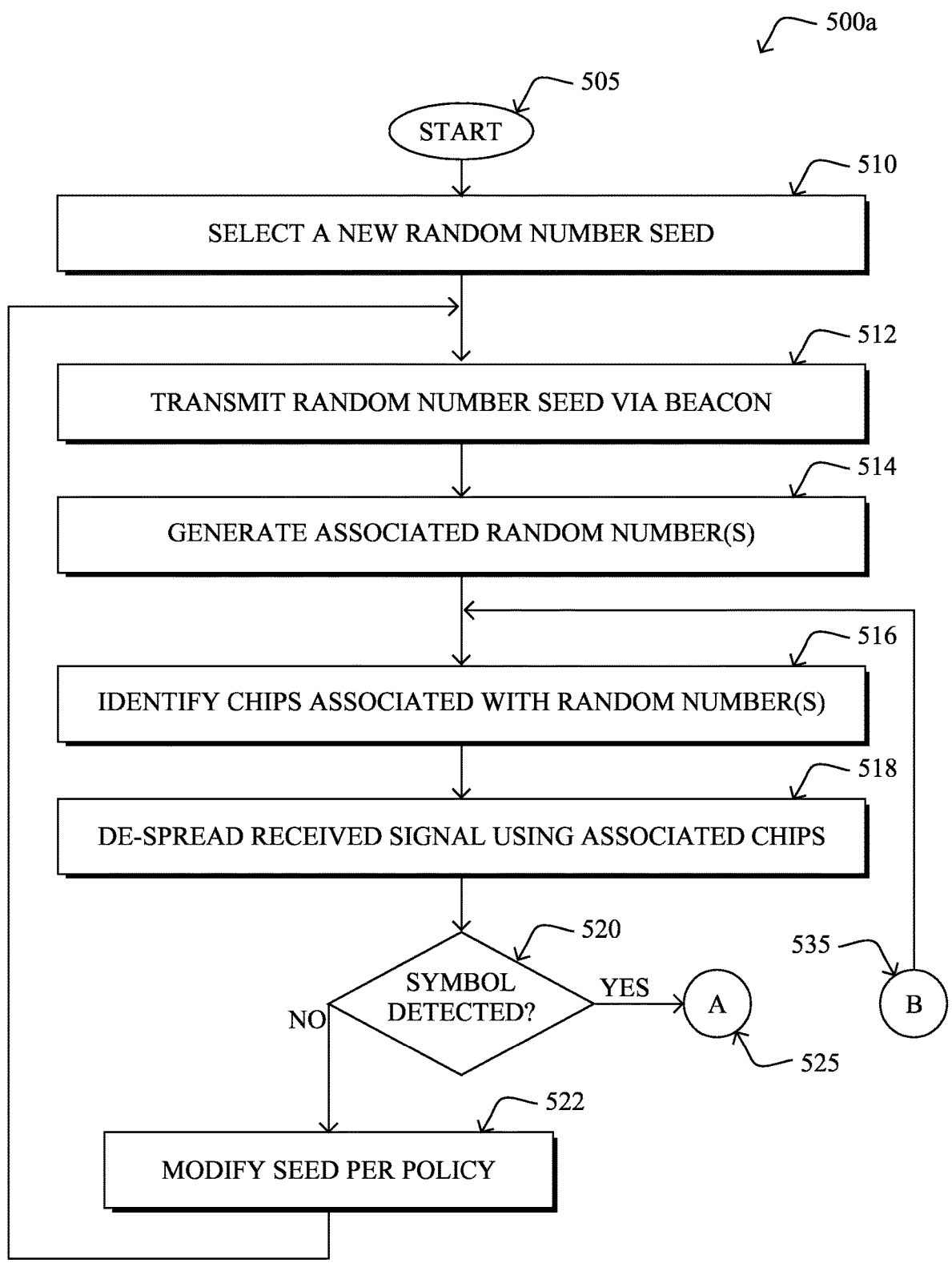
FIGS. 5A-5B illustrate an example simplified procedure for ground station beacon transmission and message reception in accordance with one or more embodiments of the present disclosure.
Figure 5B:
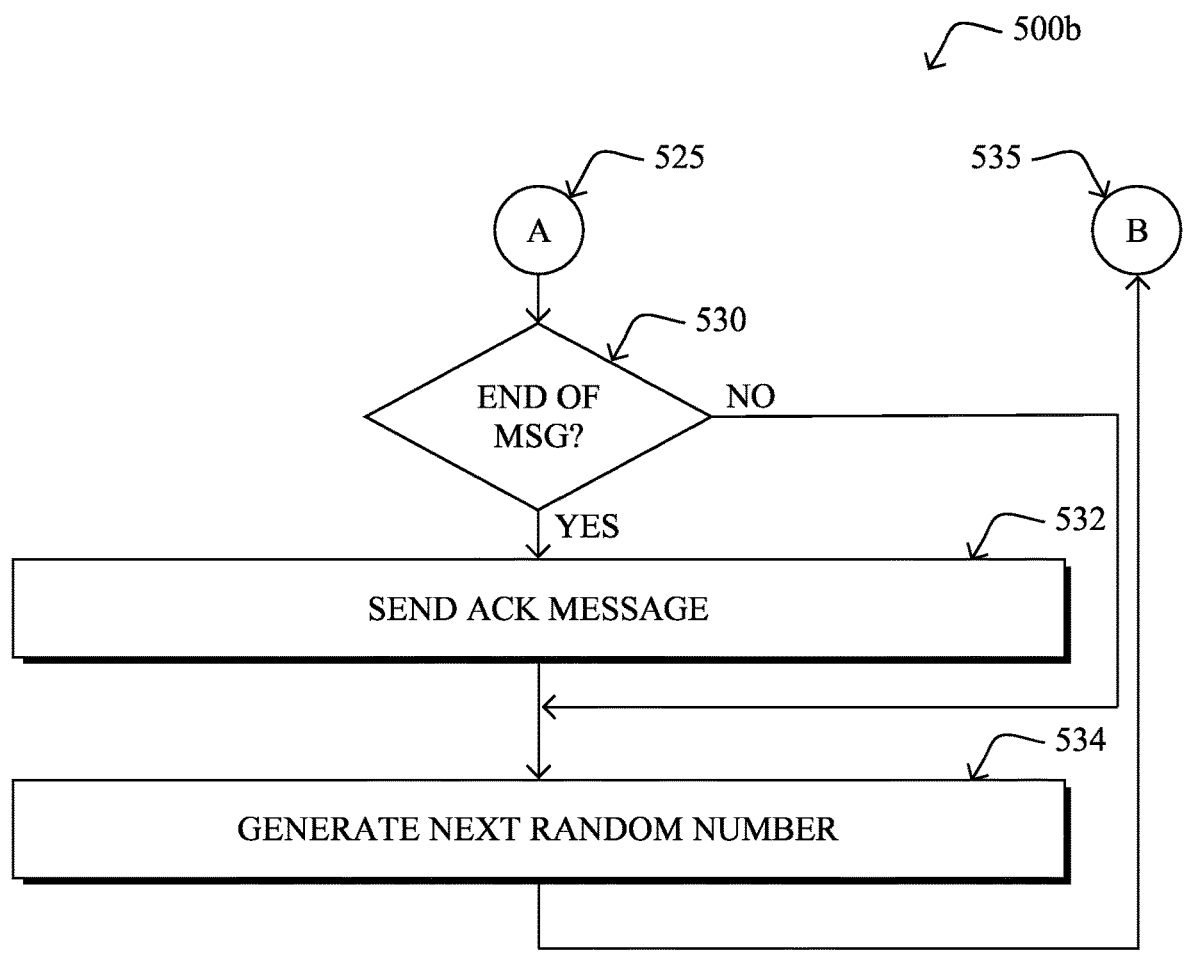

FIGS. 5A-5B provide an example procedure (flowcharts 500a and 500b) of ground station beacon transmission and message reception. The process starts at operation 505 and proceeds to operation 510 where the ground station selects a random number seed. For example the number can be obtained by taking a specific counter number in the software, checking the specific time a SW module was reset, etc.

The process continues to operation 512 where the seed number is added into a broadcast message and transmitted to all UEs as part of a beacon signal transmitted via the satellite towards the UEs.

In operation 514 the ground station generates random numbers based on the seed number, e.g., by a random number generator such as random number generator 320 of FIG. 3.

The process proceeds to operation 516 where the method uses a chip table such as chip table 350 of FIG. 3 to generate a sequence of associated chips (identifying chips associated with the random numbers).

The process proceeds to operation 518 where the sequence of chips is used to de-spread the received signal. In operation 520 the method examines the de-spread signal and determines whether the received signal contains symbols associated with a message transmitted from one of the UEs such as UE 210 of FIG. 2.

If operation 520 determines that the ground station receiver did not detect any symbols sent from any UE, the process proceeds to operation 522. In operation 522 the method utilizes a preprogramed or a preconfigured rule for updating the seed of the random number generator. For example, the update may occur every second, minute, hour, every day or at any random period. The updated (or old) seed number is communicated to operation 512 wherein the new (or old) seed number is broadcasted to the UEs.

However if operations 520 detects a symbol (or symbols) as part of a message sent from a UE such as UE 210 of FIG. 2, the process proceeds via a connector A 525 to operation 530 in flowchart 500b of FIG. 5B. Operation 530 examines whether the detected symbol signifies that the end of the message has been detected. If the end of the message has been detected the method proceeds to operation 532 wherein the ground station sends an acknowledgement message to the UE, and the method proceeds to operation 534.

However, if operation 530 determines that the detected symbol does not signify that an end of a message has been detected, the method proceeds directly to operation 534 where a new random number is generated.

In either case, the method loops back via connection step B 535 and uses the chip table such as chip table 350 of FIG. 3 to generate a new set of chips for detecting the next message from the UE in operation 516 of FIG. 5A.

Transmissions of messages from the ground station which do not need to be concealed can use a single predetermined chip known to both the ground station and the UEs. Alternatively, the ground station may also use a time varying chip sequence as described below.

Figure 6A:
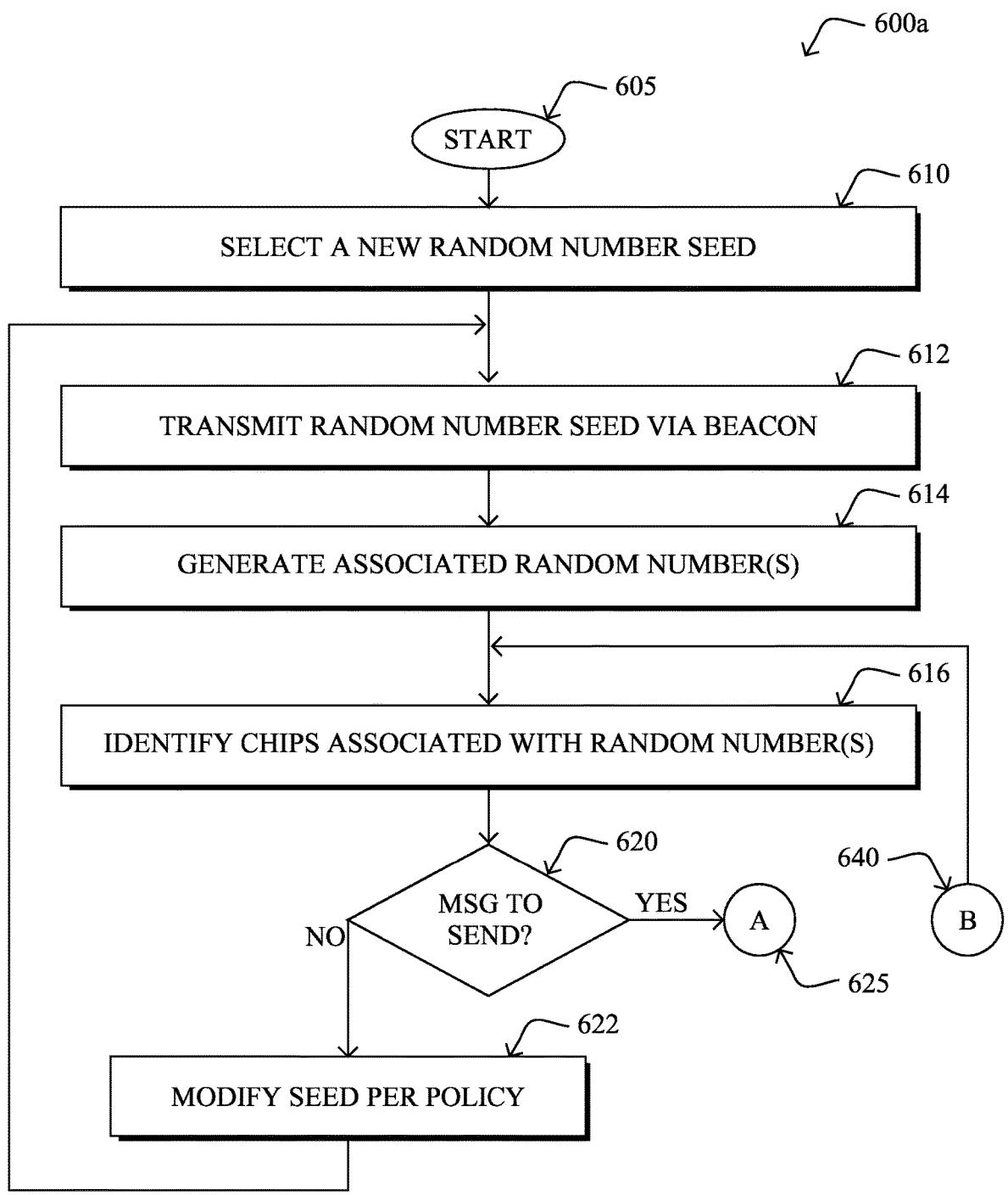
FIGS. 6A-6B illustrate an example simplified procedure for sending a message from a ground station to a user equipment device (UE) in accordance with one or more embodiments of the present disclosure.
Figure 6B:
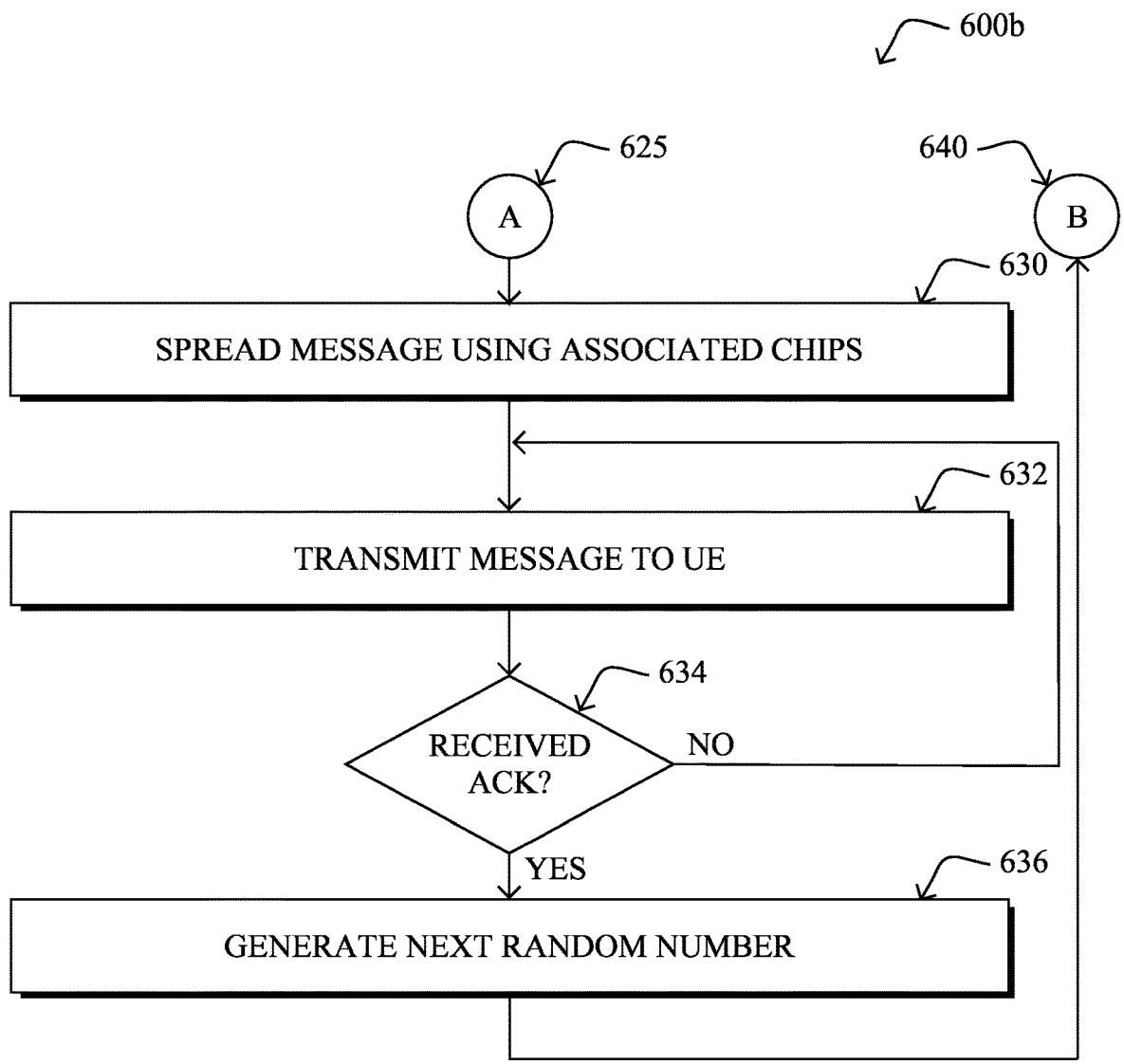

FIGS. 6A-6B provide an example procedure (flowcharts 600a and 600b) of sending a message from the ground station to a UE. The process starts at operation 605 and proceeds to operation 610 where the ground station selects a random number seed. For example the number can be obtained by taking a specific counter number in the software, checking the specific time a SW module was reset, etc. This step is identical to step 510 of FIG. 5A.

The process continues to operations 612 where the seed number is added into a broadcast message and transmitted to all UEs as part of a beacon signal transmitted via the satellite towards the UEs. By receiving the seed number UEs are able to generate the same random number as the one generated in the ground station and consequently generate the same chip sequence which is used by the ground station to spread a transmitted message. This step is the same as step 512 of FIG. 5A.

In operation 614, which is the same as operation 514 of FIG. 5A, the ground station generates random numbers based on the seed number, e.g., by a random number generator such as random number generator 320 of FIG. 3.

The method proceeds to operation 616, which is the same as operation 516 of FIG. 5A, where the method uses a chip table such as chip table 350 of FIG. 3 to generate a sequence of associated chips.

The method proceeds to step 620 where the operation determines if the ground station has a message that it needs to send to a specific UE. In accordance with one embodiment the determination that the ground station needs to transmit the message is made based on the fact that the ground station has a message for a UE in its outbound queue. In accordance with yet another embodiment the determination is based on the existence of a message in the outbound queue as well as a request from the UE to transmit to it any message that is intended to it.

If the operation determines that there is no message in the outbound queue, the method proceeds to operation 622, which is identical to operation 522 of FIG. 5A, where the operational rules determine whether the random number should be modified, and if affirmative, modify the random number using the random number generator 320 above of FIG. 3. The method then loops back to operation 612 where the ground station continues to send the beacon signal (including the updated seed number for the random generator), and de-spread the received signal in an attempt to detect incoming messages—if any.

However if operation 620 determines that there is a message to be sent to a UE, the method proceeds via a connection step A 625 to operation 630 in flowchart 600b of FIG. 6B.

Operation 630 spreads the symbols of the message using a sequence of chips associated with the sequence of random numbers derived in step 614 using the random number generator 320 of FIG. 2. The method proceeds to operation 632 where the spread spectrum message is transmitted.

In operation 634 the ground station awaits for a predetermined time to receive an acknowledgement from the UE that it has received the message. If an acknowledgement message has not been received within a predetermined threshold time, the method loops back to step 632 and retransmits the message.

However if operation 634 determines that an Ack message has been received, the method proceeds to operation 636 where the operation generates the next random number, e.g., using the random number generator 320 of FIG. 3.

The method then loops back via connector step B 640 to operation 616 in FIG. 6A where the next chip (or chip-set) to be used for communication with said UE is determined.

Figure 7A:
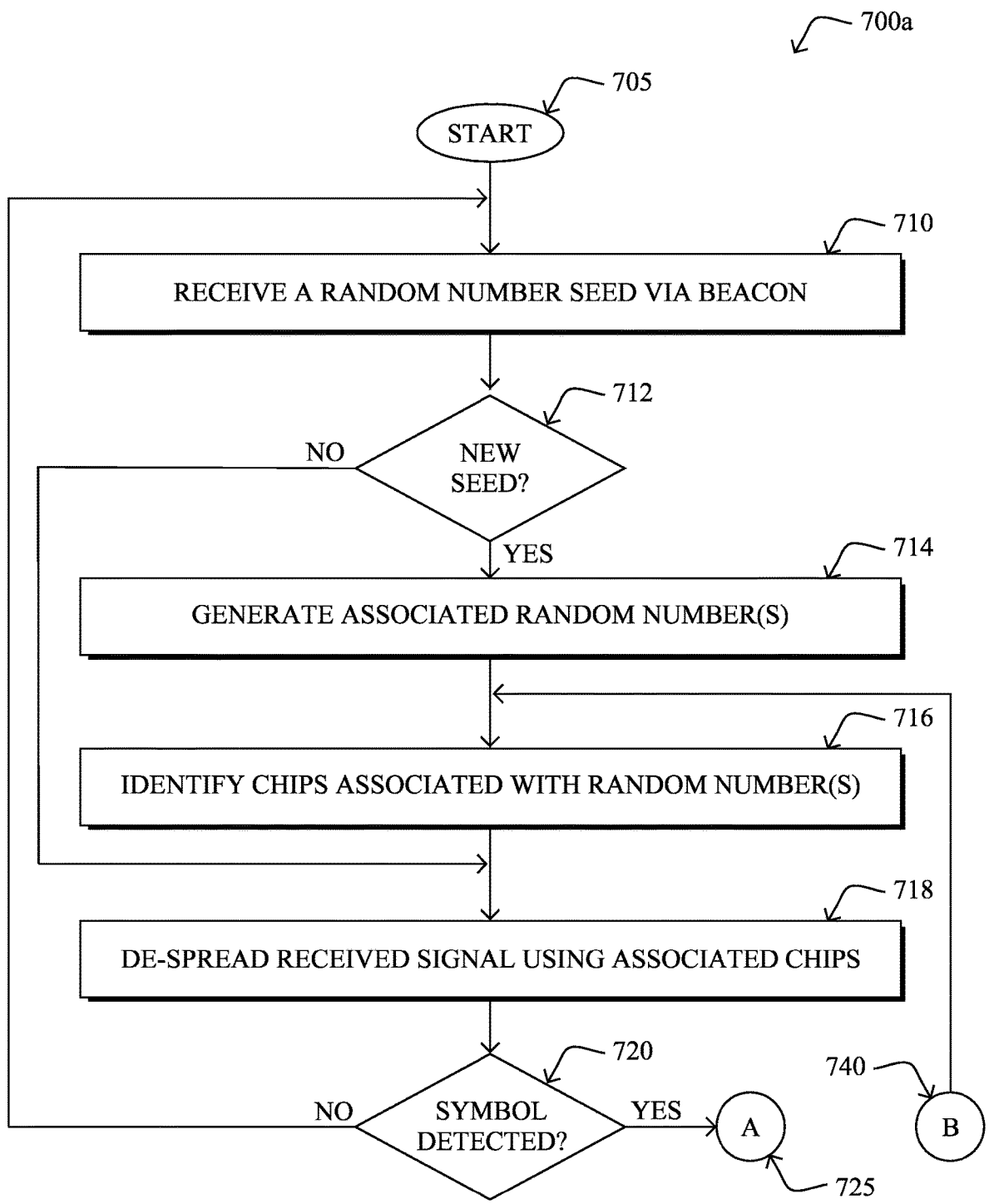
FIGS. 7A-7B illustrate an example simplified procedure for message reception by a UE in accordance with one or more embodiments of the present disclosure.
Figure 7B:
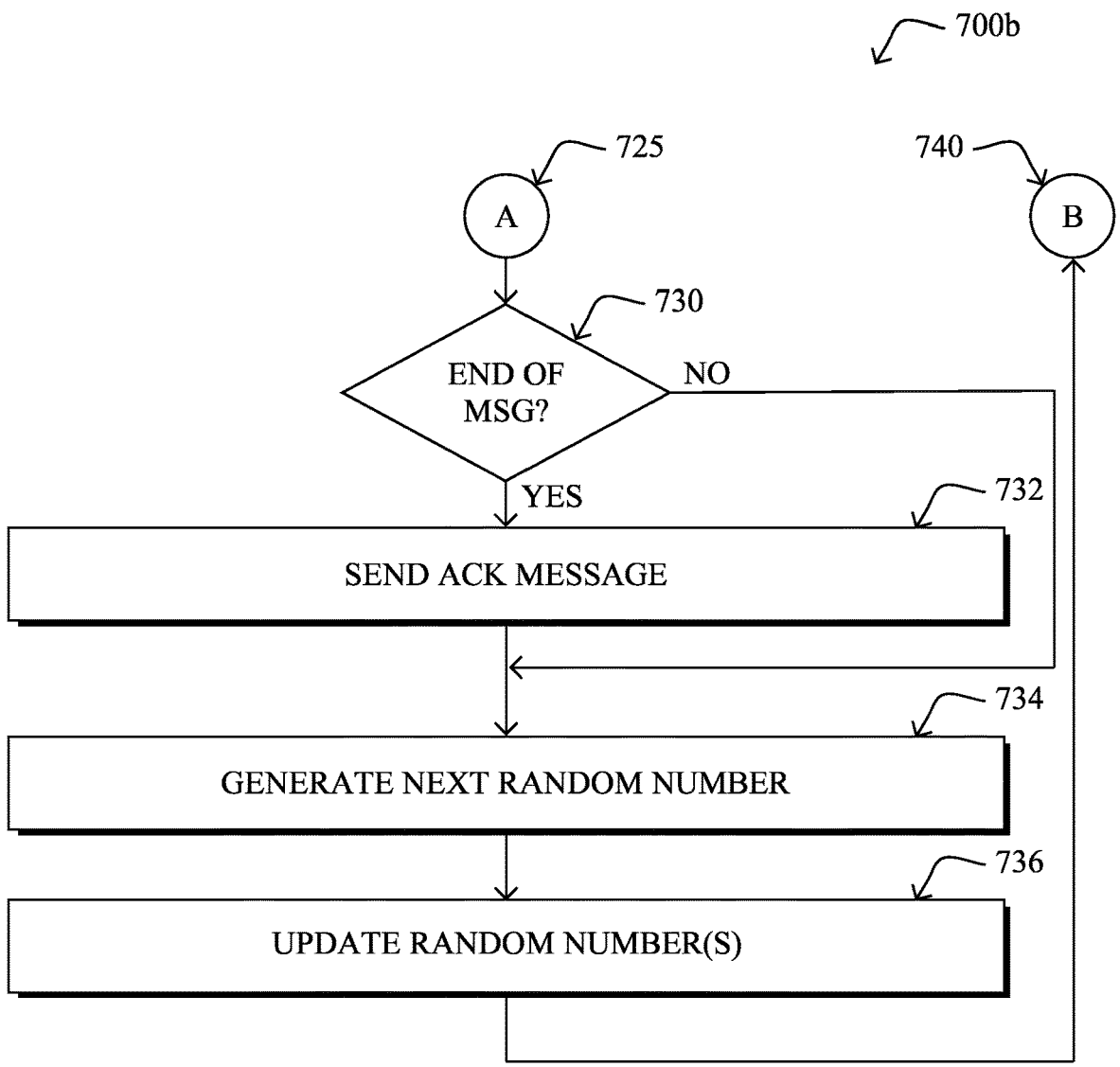

FIGS. 7A-7B provide an example procedure (flowcharts 700a and 700b) of process by which UE receives a message from the ground station via a satellite. It should be noted that while the process below described a flow wherein the ground station transmits (via a satellite) a spread spectrum signal that uses a randomly variable chip sequence, this operation is optional as the location of satellites is well known and as such the satellite may not need to reduce its radio signature. Rather, the satellite may use a specific not randomly variable, spreading chip.

The process starts at operation 705 and proceeds to operation 710 where the UE receives a random number seed broadcasted by a satellite from a ground station.

The process continues to operations 712 where operation determines whether the seed number is a new seed or the same as received from the previous broadcast message. If the operation determines that the seed number did not change, the flow proceeds directly to operation 716. However if the operation determines that the seed number obtained from the current beacon message is different from the previous seed number, e.g., sent over the beacon signal, the method proceeds to operation 714.

In operation 714 the UE generates random numbers based on the seed number obtained via the received beacon message, e.g., by a random number generator such as random number generator 420 of FIG. 4.

The process proceeds to operation 716 where the method uses a chip table such as chip table 450 of FIG. 4 to generate a sequence of associated chips.

The flow proceeds to operation 718 where the sequence of chips is used to de-spread the received signal. In operation 720 the method examines the de-spread signal and determines whether the received signal contains symbols associated with a message transmitted from one of the ground station such as ground station 230 of FIG. 2.

If operation 720 determines that the UE receiver did not detect any symbols sent from the ground station, the process loops back to operation 710.

However if operations 720 detects a symbol (or symbols) as part of a message sent from a ground station such as ground station 230 of FIG. 2, the flow proceeds via a connector A 725 to operation 730 of flowchart 700b in FIG. 7B. Operation 730 examines whether the detected symbol signifies that an end of the message has been detected. If an end of the message has been detected the method proceeds to operation 732 wherein the UE sends an acknowledgement message to the ground station, and the method proceeds to operation 734.

However if operation 730 determines that the detected symbol does not signify that an end of a message has been detected, the method proceeds directly to operation 734 where a new random number is generated. The flow proceeds to operation 736 where the new random number or in another embodiment, the new sequence of random numbers is updated.

The method loops back via connection step B 740 to operation 716 in FIG. 7A where the operation uses the chip table such as chip table 450 of FIG. 4 to generate a new set of chips for detecting the next message from the ground station.

Figure 8A:
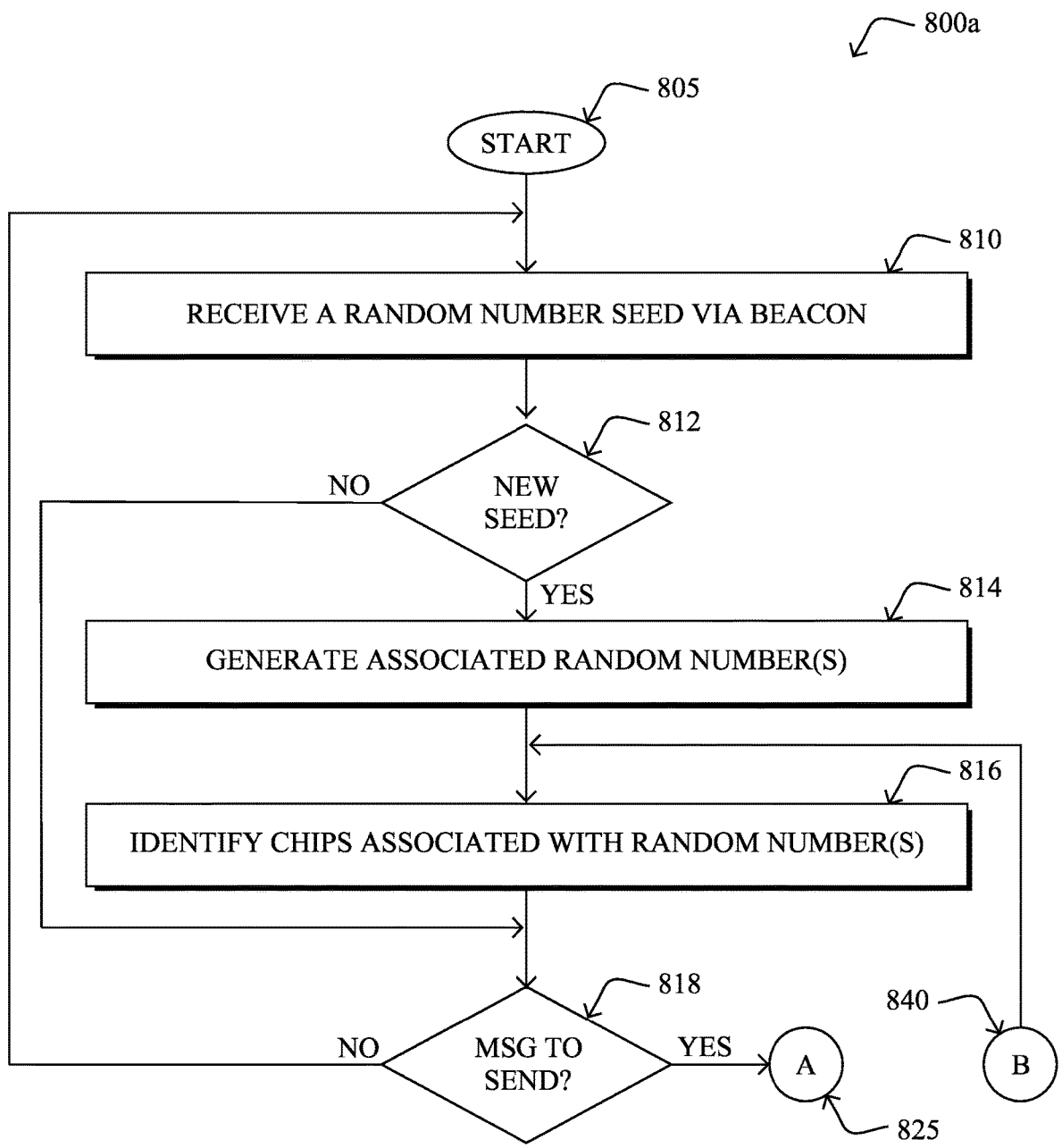
FIGS. 8A-8B illustrate an example simplified procedure for sending a message from a UE to a ground station in accordance with one or more embodiments of the present disclosure.
Figure 8B:
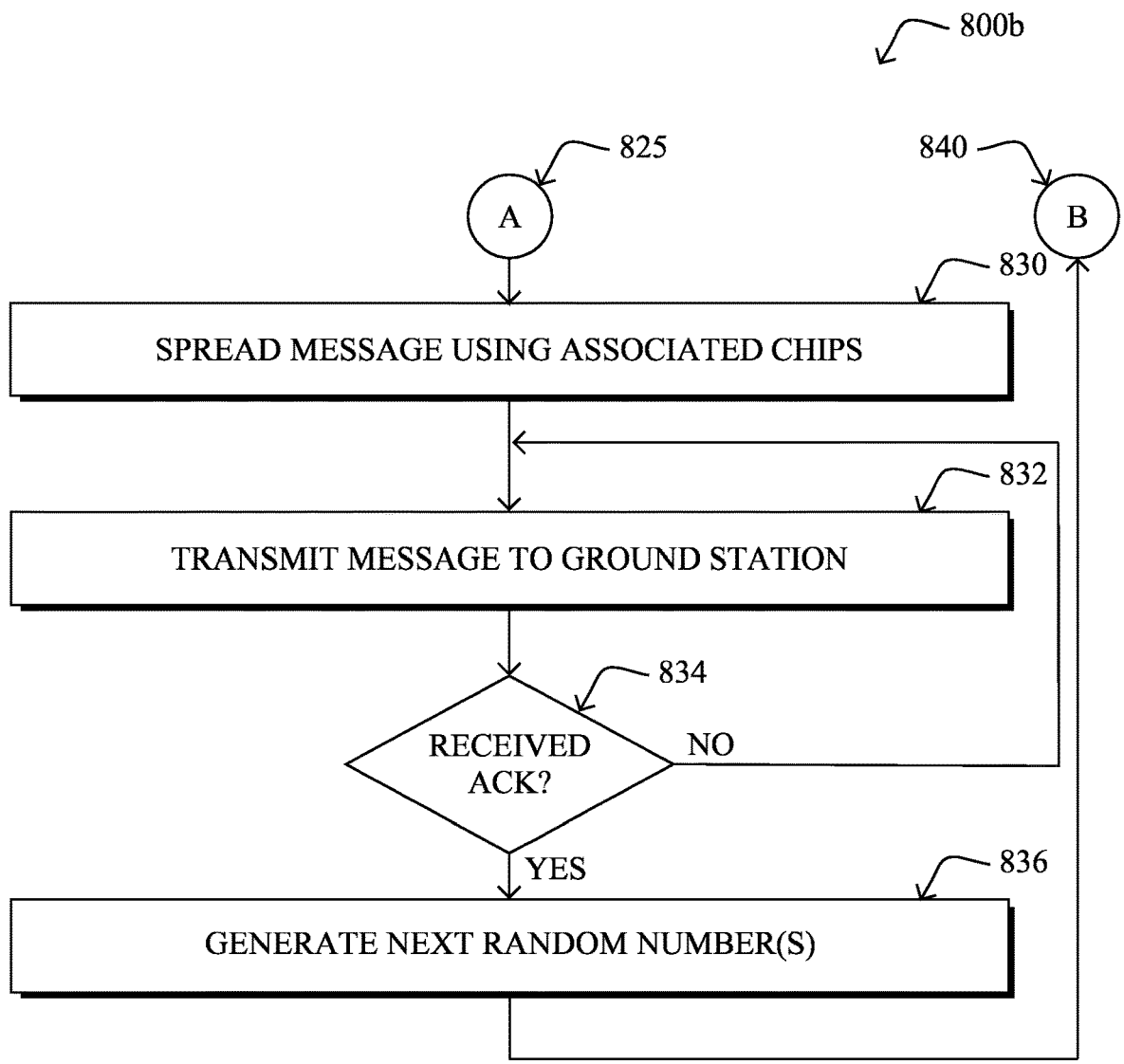

FIGS. 8A-8B provide an example procedure (flowcharts 800a and 800b) of sending a message from a UE to a ground station.

The process starts at operation 805 and proceeds to operation 810 where the UE receives a random number seed from the ground station via a broadcast beacon message. This step is identical to step 710 of FIG. 7A.

The process continues to operations 812 where operation determines whether the seed number is a new seed or the same as received from the previous broadcast message. This step is the same as step 712 of FIG. 7A.

If the operation determines that the seed number did not change, the flow proceeds directly to operation 816. However if the operation determines that the seed number obtained from the current beacon message is different from the previous seed number sent via the beacon, the method proceeds to operation 814.

In operation 814, which is the same as operation 714 of FIG. 7A, the UE generates random numbers based on the seed number obtained via the received beacon message, e.g., by using a random number generator such as random number generator 420 of FIG. 4.

The flow proceeds to operation 816, which in some embodiments is the same as operation 716, where the method uses a chip table such as chip table 450 of FIG. 4 to generate a sequence of associated chips.

The flow proceeds to operation 818 where the operation determines whether the UE has a message to be sent via the satellite to the ground station. If the operation determines that there are no messages to be sent to the ground station the flow loops back to operation 810 where the UE obtains a random number seed from a received beacon message.

However if operation 818 determines that the UE has a message that needs to be sent via a satellite to the ground station, flow proceeds via connector operation A 825 to operation 830 in flowchart 800b of FIG. 8B. Operation 830 uses the sequence of chips determined in step 816 to spread symbols of the message. Flow continues to operation 832 where the message is transmitted from the UE to the ground station. Because the random numbers in the UE and the ground station are synchronized both the UE and the ground station use the same sequence of chips, this enables the ground station to de-spread and demodulate the received signal transmitted from the UE. Adversary receivers that utilize a constant single chip receiver would be able to detect at best a single symbol from a large number of symbols. As such adversary receivers would detect at best much reduced radio power resulting in greater concealment of the UE transmission.

Flow proceeds to operation 834 where the operation awaits for a predetermined time to receive an acknowledgement from the ground station that it has received the message. If operation 834 determines that an acknowledgement has not been received in the predetermined time window, e.g., five seconds, the flow loops back to operation 832 and the message is resent.

However if the message has been received successfully by the ground station and a corresponding acknowledgement has been received by the UE, the flow proceeds to operation 836 where a new random number(s) is generated using the random number generator of the UE.

The process loops back via connector operation B 840 to operation 816 in FIG. 8A where the updated sequence of random numbers is used to generate a new sequence of chips to be used for spreading the symbols of the next message.

It should be noted that while certain steps within the flowcharts may be optional and the steps shown in the figures are merely examples for illustration, and certain other steps may be included or excluded as desired. Furthermore, while a particular order of the steps is shown, this ordering is merely illustrative, and any suitable arrangement of the steps may be utilized without departing from the scope of the embodiments herein. Moreover, the methods are described separately, certain steps from each procedure may be incorporated into one or more of the other methods and the various steps are not meant to be mutually exclusive.

Advantageously, the techniques herein thus provide for concealed spread symbol communication. In particular, as described above, the techniques herein provide, in one embodiment, a method for transmitting information from a device or sensor to the ground station comprising: receiving a means for synchronizing the user equipment and the ground station (e.g., receiving a random number seed from a ground station via a satellite, as described above); determining a random number based on the received seed number; determining a random sequence of chips based on the random number; spreading the symbols of the message by the random sequence of chips; and sending the spread spectrum modulated message to the ground station.

Furthermore, while the description above describes the synchronization between the user equipment and the ground station to be achieved by transmitting a random number seed via the satellite beacon signal, other synchronization methods are contemplated herein as well. In addition, while the illustrative beaconing device is shown as the ground station, other embodiments allow for the beaconing device to be a mobile terminal, thus defining the random number seed.

According to the embodiments of the present disclosure, an illustrative method herein may comprise: coordinating, by a particular device, a random number seed that is generated by a beaconing device and transmitted to one or more remote devices; generating, by the particular device, one or more random numbers based on the random number seed; determining, by the particular device, one or more spreading code chips associated with the one or more random numbers; and communicating, by the particular device, a spread spectrum message between the beaconing device and a specific remote device of the one or more remote devices based on one of either spreading or de-spreading the spread spectrum message according to the one or more spreading code chips.

In one embodiment, the beaconing device is a ground station for satellite communication, and wherein the one or more remote devices comprise mobile terminals.

In one embodiment, the random number seed is transmitted to the one or more remote devices via a broadcast message transmitted to all remote devices as part of a beacon signal from the beaconing device.

In one embodiment, the particular device is the beaconing device, and the coordinating comprises: generating the random number seed; and transmitting the random number seed to the one or more remote devices within a beacon message.

In one embodiment, the particular device is the specific remote device, and the coordinating comprises: receiving the random number seed within a beacon message from the beaconing device.

In one embodiment, identifying the one or more spreading code chips associated with the one or more random numbers is based on one of either using a chip table or a computer program.

In one embodiment, the particular device is the specific remote device, the method further comprising: determining whether the random number seed is an update from a previously received random number seed, wherein generating the one or more random numbers and identifying the one or more spreading code chips is in response to the random number seed being an update from a previously received random number seed.

In one embodiment, the one or more random numbers and the one or more spreading code chips comprise a sequence of a plurality of random numbers and a sequence of a plurality of spreading code chips, respectively.

In one embodiment, the particular device is a transmitter, and communicating comprises: spreading symbols of the spread spectrum message according to the one or more spreading code chips; and transmitting the spread spectrum message to a receiver device. In one embodiment, the method further comprises: awaiting for a predetermined time to receive an acknowledgement from the receiver device that it has received the spread spectrum message; in response to the acknowledgement not being received within the predetermined time, retransmitting the spread spectrum message; and in response to the acknowledgement being received within the predetermined time, determining one or more next random numbers and one or more next spreading code chips associated with the one or more next random numbers for a next communication.

In one embodiment, the particular device is the beaconing device, and the method further comprises: determining to initiate a communication to the specific remote device based on the beaconing device having the spread spectrum message to send to the specific remote device. In one embodiment, the method further comprises: determining to initiate the communication to the specific remote device based additionally on receiving a request from the specific remote device for the beaconing device to transmit any messages intended to the specific remote device.

In one embodiment, the particular device is a receiver, and communicating comprises: de-spreading a received signal using the one or more spreading code chips into a de-spread signal; and examining the de-spread signal to determine whether the received signal contains symbols associated with a message transmitted from a transmitter to the receiver. In one embodiment, the method further comprises:

determining, in response to no symbols being detected in the de-spread signal, update for the random number seed according to an update rule. In one embodiment, the method further comprises: examining, in response to one or more symbols being detected in the de-spread signal, whether the one or more symbols signify an end of a communication; in response to the one or more symbols signifying the end of the communication, returning an acknowledgment; and in response to the one or more symbols not signifying the end of the communication; determining one or more new random numbers and one or more new spreading code chips associated with the one or more new random numbers to continue de-spreading the received signal.

In one embodiment, the one or more spreading code chips are based on an orthogonal variable spreading factor (OVSF) spread spectrum scheme.

In one embodiment, the particular device is a receiver, and communicating comprises: listening to received signals using a current spreading code chip associated with a current random number and a previous spreading code chip associated with a previous random number to account for communication delay between a transmitter and the receiver.

In one embodiment, the particular device is the specific remote device, and the method further comprises: determining a potential breakdown in communication synchronization with the beaconing device; and in response to the potential breakdown in communication synchronization, reverting back to listening for a beacon message for coordinating a current random number seed that is generated by the beaconing device and transmitted to the one or more remote devices.

Additionally, an illustrative tangible, non-transitory, computer-readable medium herein may store program instructions that cause a computer of a particular device to execute a method comprising: coordinating a random number seed that is generated by a beaconing device and transmitted to one or more remote devices; generating one or more random numbers based on the random number seed; determining one or more spreading code chips associated with the one or more random numbers; and communicating a spread spectrum message between the beaconing device and a specific remote device of the one or more remote devices based on one of either spreading or de-spreading the spread spectrum message according to the one or more spreading code chips.

Moreover, an illustrative apparatus herein may comprise: a processor configured to execute one or more processes; a communication interface; and a memory configured to store a process executable by the processor that when executed is configured to: coordinate a random number seed that is generated by a beaconing device and transmitted to one or more remote devices; generate one or more random numbers based on the random number seed; determine one or more spreading code chips associated with the one or more random numbers; and communicate a spread spectrum message between the beaconing device and a specific remote device of the one or more remote devices based on one of either spreading or de-spreading the spread spectrum message according to the one or more spreading code chips.

While there have been shown and described illustrative embodiments, it is to be understood that various other adaptations and modifications may be made within the scope of the embodiments herein. For example, the embodiments may, in fact, be used in a variety of types of wireless communication networks and/or protocols, and need not be limited to the illustrative satellite network implementation. Furthermore, while the embodiments may have been demonstrated with respect to certain communication environments, physical environments, or device form factors, and in particular satellite communication environments, other configurations may be conceived by those skilled in the art that would remain within the contemplated subject matter of the description above, including other types of wireless communication mediums aside from satellite communications.

It will also be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Notably, in other embodiments, user intervention is not necessary at "user equipment" 210/250, and as such, various automated terminals, drones/UAVs, weaponry, etc., may employ the techniques herein. The use of the term "user" herein thus is not meant to be limiting to the scope of the types of devices implementing the techniques herein.

Furthermore, in the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

In particular, the foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
coordinating, by a particular device, a random number seed that is generated by a beaconing device and transmitted to one or more remote devices;
generating, by the particular device, one or more random numbers based on the random number seed;
determining, by the particular device, one or more spreading code chips associated with the one or more random numbers; and
communicating, by the particular device, a spread spectrum message between the beaconing device and a specific remote device of the one or more remote devices based on one of either spreading or de-spreading the spread spectrum message according to the one or more spreading code chips.

2. The method as in claim 1, wherein the beaconing device is a ground station for satellite communication, and wherein the one or more remote devices comprise mobile terminals.

3. The method as in claim 1, wherein the random number seed is transmitted to the one or more remote devices via a broadcast message transmitted to all remote devices as part of a beacon signal from the beaconing device.

4. The method as in claim 1, wherein the coordinating comprises:
generating the random number seed; and
transmitting the random number seed to the one or more remote devices within a beacon message.

5. The method as in claim 1, wherein the coordinating comprises:
receiving the random number seed within a beacon message from the beaconing device.

6. The method as in claim 1, wherein identifying the one or more spreading code chips associated with the one or more random numbers is based on one of either using a chip table or a computer program.

7. The method as in claim 1, further comprising:
determining whether the random number seed is an update from a previously received random number seed, wherein generating the one or more random numbers and identifying the one or more spreading code chips is in response to the random number seed being the update from the previously received random number seed.

8. The method as in claim 1, wherein the one or more random numbers and the one or more spreading code chips comprise a sequence of a plurality of random numbers and a sequence of a plurality of spreading code chips, respectively.

9. The method as in claim 1, wherein the particular device is a transmitter, and wherein communicating comprises:
spreading symbols of the spread spectrum message according to the one or more spreading code chips; and
transmitting the spread spectrum message to a receiver device.

10. The method as in claim 9, further comprising:
awaiting for a predetermined time to receive an acknowledgement from the receiver device that it has received the spread spectrum message;
in response to the acknowledgement not being received within the predetermined time, retransmitting the spread spectrum message; and
in response to the acknowledgement being received within the predetermined time, determining one or more next random numbers and one or more next spreading code chips associated with the one or more next random numbers for a next communication.

11. The method as in claim 1, further comprising:
determining to initiate a communication to the specific remote device based on the beaconing device having the spread spectrum message to send to the specific remote device.

12. The method as in claim 11, further comprising:
determining to initiate the communication to the specific remote device based additionally on receiving a request from the specific remote device for the beaconing device to transmit any messages intended to the specific remote device.

13. The method as in claim 1, wherein the particular device is a receiver, and wherein communicating comprises:
de-spreading a received signal using the one or more spreading code chips into a de-spread signal; and
examining the de-spread signal to determine whether the received signal contains symbols associated with a message transmitted from a transmitter to the receiver.

14. The method as in claim 13, further comprising:
determining, in response to no symbols being detected in the de-spread signal, update for the random number seed according to an update rule.

15. The method as in claim 13, further comprising:
examining, in response to one or more symbols being detected in the de-spread signal, whether the one or more symbols signify an end of a communication;
in response to the one or more symbols signifying the end of the communication, returning an acknowledgment; and
in response to the one or more symbols not signifying the end of the communication; determining one or more new random numbers and one or more new spreading code chips associated with the one or more new random numbers to continue de-spreading the received signal.

16. The method as in claim 1, wherein the one or more spreading code chips are based on an orthogonal variable spreading factor (OVSF) spread spectrum scheme.

17. The method as in claim 1, wherein the particular device is a receiver, and wherein communicating comprises:
listening to received signals using a current spreading code chip associated with a current random number and a previous spreading code chip associated with a previous random number to account for communication delay between a transmitter and the receiver.

18. The method as in claim 1, further comprising:
determining a potential breakdown in communication synchronization with the beaconing device; and
in response to the potential breakdown in communication synchronization, reverting back to listening for a beacon message for coordinating a current random number seed that is generated by the beaconing device and transmitted to the one or more remote devices.

19. A tangible, non-transitory, computer-readable medium storing program instructions that cause a computer of a particular device to execute a method comprising:
coordinating a random number seed that is generated by a beaconing device and transmitted to one or more remote devices;
generating one or more random numbers based on the random number seed;
determining one or more spreading code chips associated with the one or more random numbers; and
communicating a spread spectrum message between the beaconing device and a specific remote device of the one or more remote devices based on one of either spreading or de-spreading the spread spectrum message according to the one or more spreading code chips.

20. An apparatus, comprising:
a processor configured to execute one or more processes;
a communication interface; and
a memory configured to store a process executable by the processor that when executed is configured to:
coordinate a random number seed that is generated by a beaconing device and transmitted to one or more remote devices;
generate one or more random numbers based on the random number seed;
determine one or more spreading code chips associated with the one or more random numbers; and
communicate a spread spectrum message between the beaconing device and a specific remote device of the one or more remote devices based on one of either spreading or de-spreading the spread spectrum message according to the one or more spreading code chips.

\* \* \* \* \*